Dec. 10, 1957  F. J. SPANG  2,815,687
DIE BLOCKS FOR FORGING A CABLE TOOL DRILL BIT
Original Filed April 18, 1950  6 Sheets-Sheet 1

INVENTOR.
Ferdinand J. Spang
BY Thomas G. Miller
FOR Green, McCallister & Miller
HIS ATTORNEYS

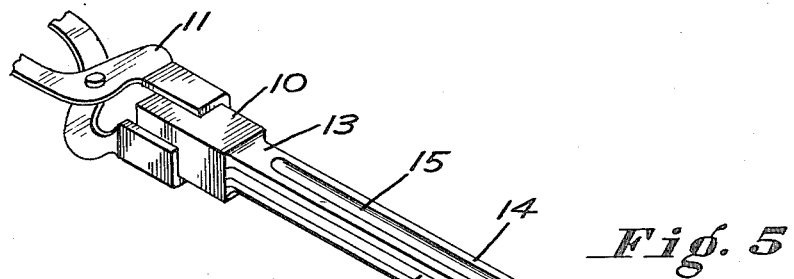
Fig. 5
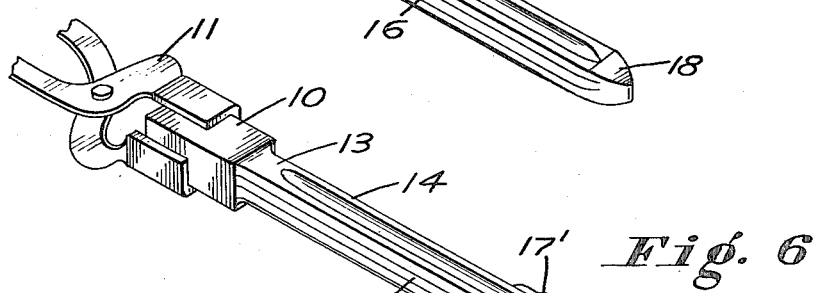
Fig. 6
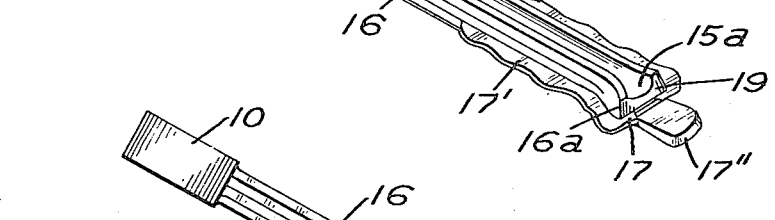
Fig. 6A
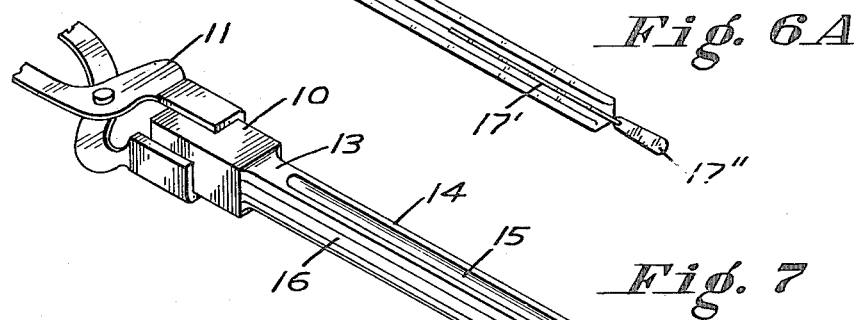
Fig. 7
INVENTOR.
Ferdinand J. Spang
BY 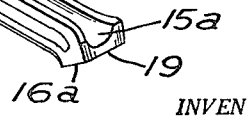
FOR Green, McCallister & Miller
HIS ATTORNEYS

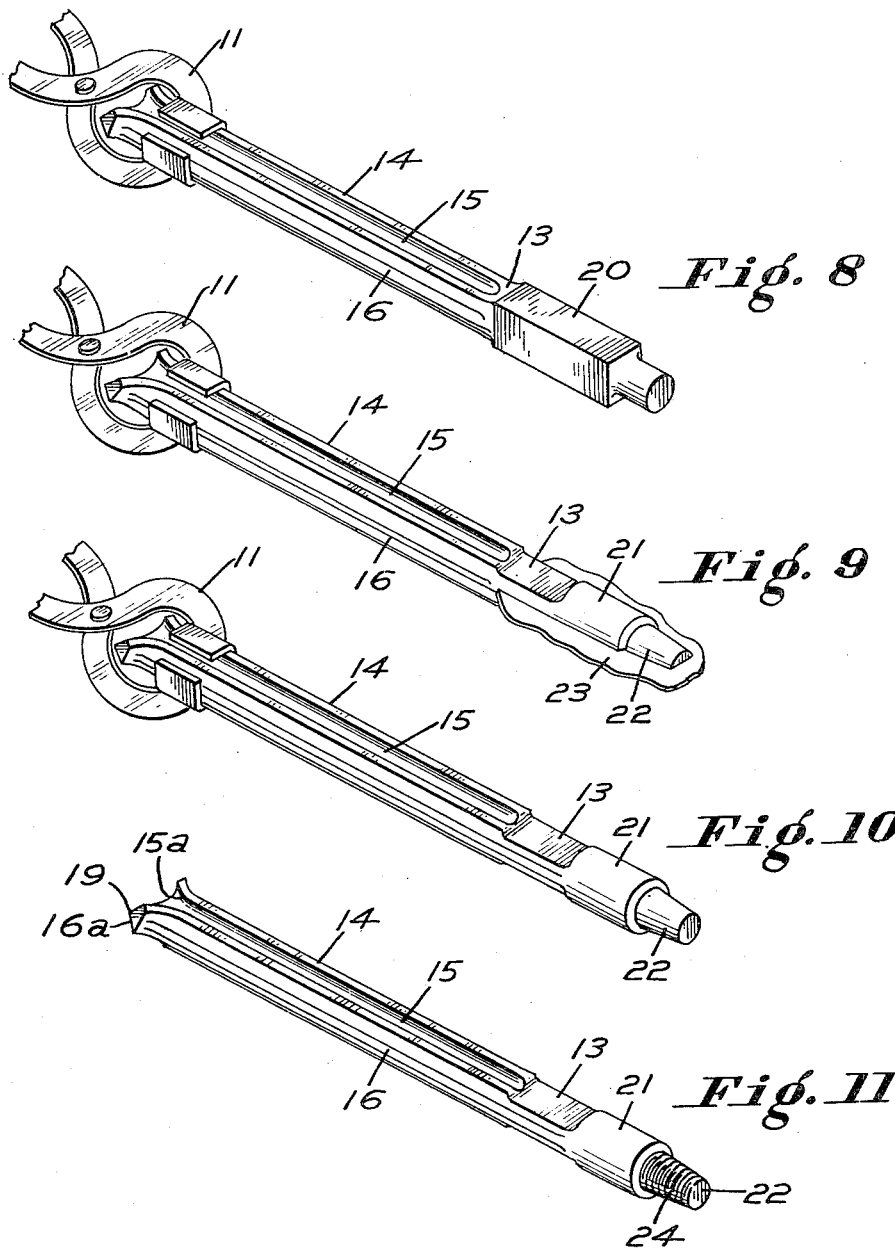

Dec. 10, 1957 F. J. SPANG 2,815,687
DIE BLOCKS FOR FORGING A CABLE TOOL DRILL BIT
Original Filed April 18, 1950 6 Sheets-Sheet 4

INVENTOR.
Ferdinand J. Spang
BY Thomas G. Miller
FOR Green, McCallister & Miller
HIS ATTORNEYS Dec. 10, 1957     F. J. SPANG     2,815,687
DIE BLOCKS FOR FORGING A CABLE TOOL DRILL BIT
Original Filed April 18, 1950     6 Sheets-Sheet 5
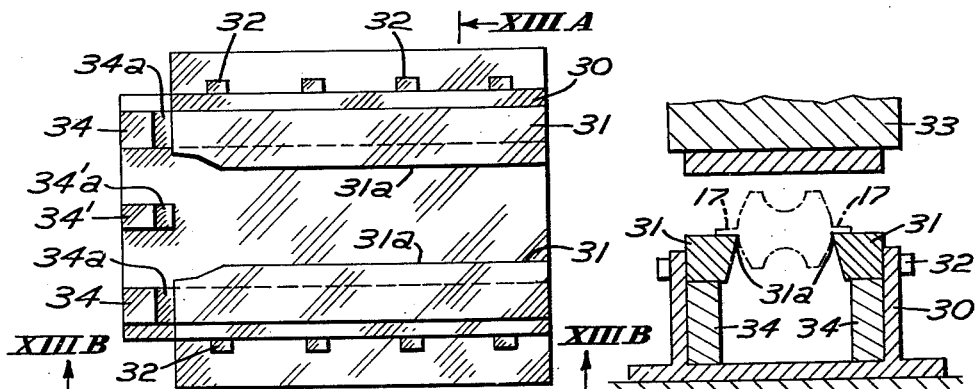
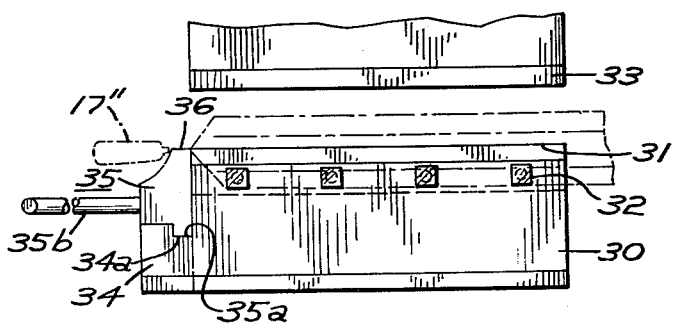
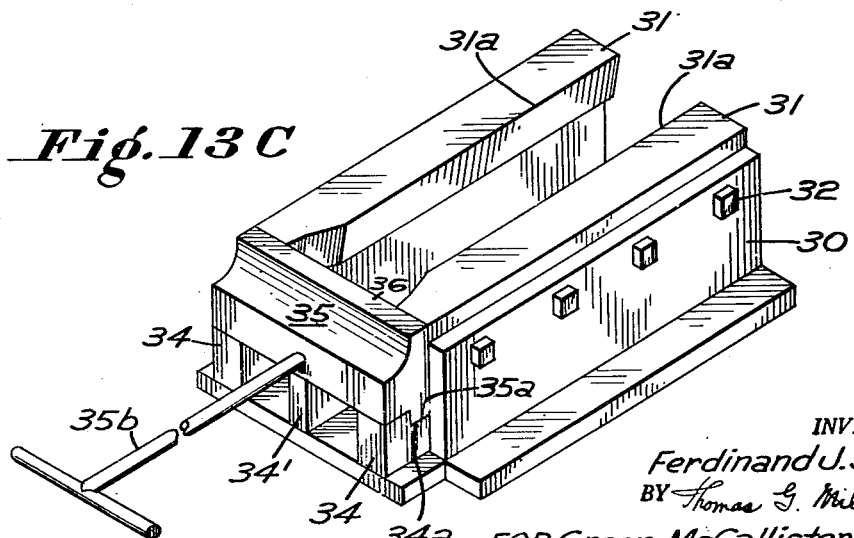
INVENTOR.
Ferdinand J. Spang
BY Thomas G. Miller
FOR Green, McCallister & Miller
HIS ATTORNEYS Dec. 10, 1957 F. J. SPANG 2,815,687
DIE BLOCKS FOR FORGING A CABLE TOOL DRILL BIT
Original Filed April 18, 1950 6 Sheets-Sheet 6
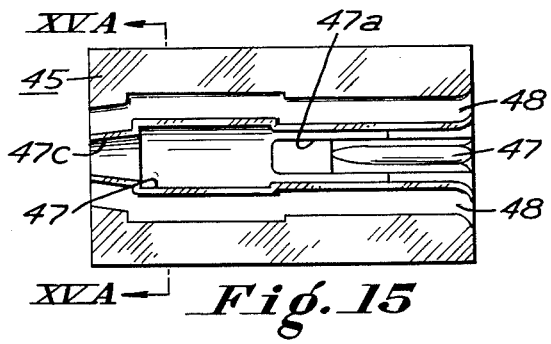
Fig. 15
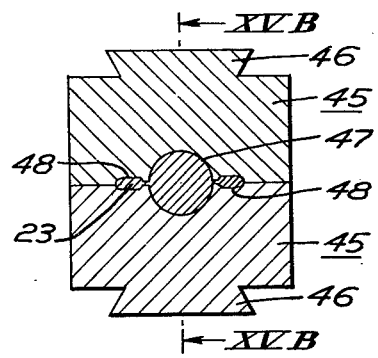
Fig. 15A
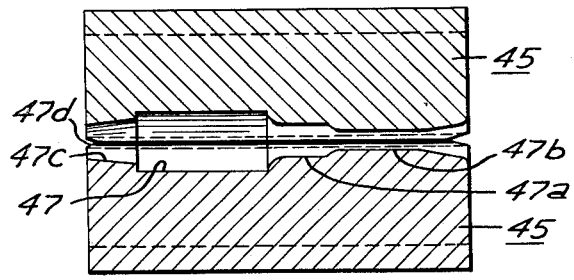
Fig. 15B
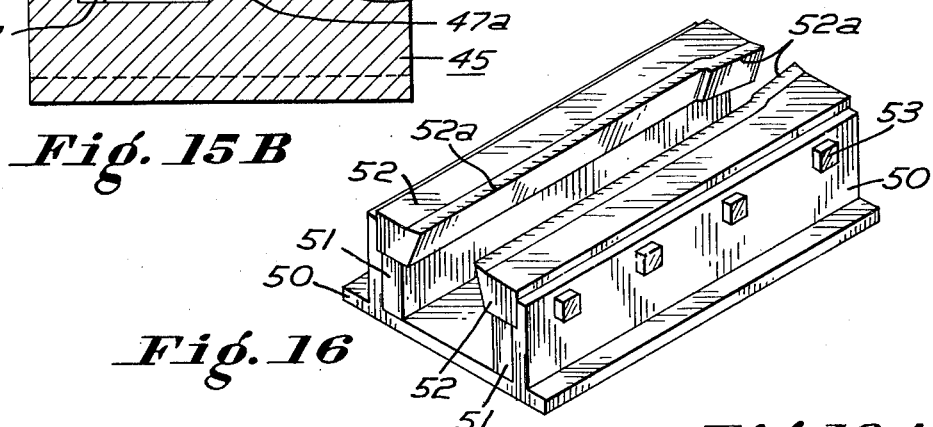
Fig. 16
Fig. 16A
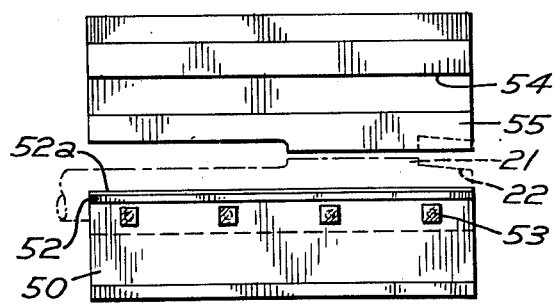
Fig. 16B
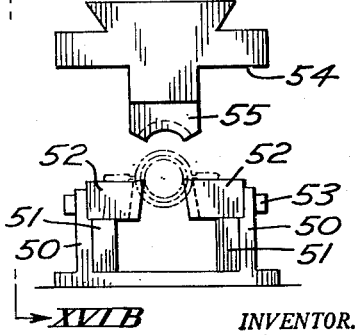
INVENTOR.
Ferdinand J. Spang
BY Thomas G. Miller
FOR Green, McCallister & Miller
HIS ATTORNEYS

United States Patent Office 2,815,687
Patented Dec. 10, 1957

2,815,687

DIE BLOCKS FOR FORGING A CABLE TOOL DRILL BIT

Ferdinand J. Spang, Butler, Pa., assignor to Spang & Company, Butler, Pa., a corporation of Pennsylvania Original application April 18, 1950, Serial No. 156,549, now Patent No. 2,661,636, dated December 8, 1953. Divided and this application September 25, 1953, Serial No. 382,372

6 Claims. (Cl. 76—95)

This invention relates to the manufacture of cable tool or percussion bits used in drilling wells and particularly, to procedure and apparatus for forging bits from steel billets. The invention relates to the forming of percussion drill bits by successive forming die forging operations as distinguished from a rolling or flat die and hand tool forming procedure.

This constitutes a division of my copending application Serial No. 156,549, originally entitled "Process and Apparatus for Forging Cable Tool Drill Bits," and filed on April 18, 1950, now Patent No. 2,661,636 of December 8, 1953.

Percussion bits used for drilling purposes in oil fields are of relatively heavy construction, for example, up to 4000 pounds or more in weight. The metallic structure should be substantially uniform both in external shape and interior fiber lines along the full length of the bit in order that it will wear uniformly and have a maximum life under the strenuous usage involved.

Bits of the type here involved have two principal parts, namely a shank and a cutting blade. The shank is generally composed of a threaded pin, collar and a wrench flat while the blade extends from the wrench flat, represents the maximum length dimension of the bit, and has a cutting end. The blade has lengthwise-extending water courses along opposite sides thereof of major transverse dimension and somewhat beveled convex, opposite cutting sides of minor transverse dimension.

Heretofore it has been customary to fully form the cutting end of the blade from the nominal blade section in the field or on the job by hand forging methods. Non-orthodox heating methods have resulted in improper metallic structures and erratic shapes at the cutting end, have wasted material, and have shortened the life of the bit. Frequently the cutting end is hopelessly damaged to the degree that it must be cut off and re-formed. Such a field operation involves locally heating the bit end and then hand hammering it out.

My Patent No. 2,216,462 of October 1, 1940, discloses an early procedure for obtaining uniformity of structure, essentially from the standpoint of the blade part of the bit. In a procedure set forth in my copending application Serial Number 655,739, filed March 20, 1946 (Patent No. 2,508,693 of May 23, 1950) I disclose a procedure for providing a substantially uniform metallic structure along the length of the bit including the blade and shank parts; in this connection, the shank part is forged in such a manner that its resulting grain structure closely approximates that of the cutter part.

In the present application, I have provided a procedure in which a substantially uniform grain structure approximating that of a rolled piece will not only be provided for the shank and blade parts, but also for the cutting end portion of the blade part which can now be substantially finished in the shop. As a result, the final dressing of the drilling or cutting end of the bit in the field is minimized, and can now be accomplished without danger of damage to the bit. That is, I have been able to insure a substantially uniform metallic or grain structure as well as physical shape, not only up to, but including the semi-finished cutting end of the bit. I insure a better bit since its cutting end is forged out under proper controls that are impossible in the field. I make practical the finish sizing of the cutting end in the field without damage to it.

It has thus been an object of my present invention to provide a new and improved forging procedure and apparatus for carrying out such procedure in the manufacture of percussion drill bits;

Another object has been to provide a form forging procedure for substantially completely forming a bit in the shop in such a manner as to insure a much better and stronger cutting end therefor;

Another object has been to provide a percussion well-drilling bit of substantially uniform metallic characteristics along its length that has a substantially finished cutting end portion as to its blade part;

A further object has been to minimize the work required in dressing a percussion drill bit in the field;

A still further object has been to provide a simple and practical forging procedure for expansion-forming a percussion drill bit and particularly, its cutting or drilling end portion;

These and many other objects of my invention will appear from the description of the embodiment chosen for the purpose of illustration and from the claims.

In the drawings,

Figure 5 is a similar view after side flash has been trimmed off;

Figure 6 is a similar view after the cutting or drilling end of the blade has been die-forged;

Figure 6A is a side view of the blank of Figure 6;

Figure 7 is a view of the blank of Figure 6 after side flash or selvage and a selvage end slug or tongue have been removed from the end portion of the blade, thus substantially completing one portion of the bit which includes a beginning portion of a wrench flat, a blade part, and an enlarged cutting or drilling end therefor;

Figure 8 is a similar view after the blank has been turned around and the other portion thereof representing the shank part has been preliminarily block or flat-die forged;

Figure 9 is a similar view after the latter portion of the blank has been die-forged to the shape of pin, collar, and wrench flat portions of the shank part;

Figure 10 is a similar view after side and end flash or selvage steel have been removed;

Figure 11 is a similar view of the completed percussion bit after the pin of the shank part has been threaded;

Figure 12A is a transverse section taken in the direction of the line XIIA—XIIA of Figure 12 and showing a pair of the dies in a closed-in blank-forming relationship and thus, defining a throat for effecting the operations involved;

Figure 12B is a side or longitudinal section in elevation taken along the line XIIB—XIIB of Figure 12A, but omitting the blank;

Figure 13 is a top plan view of a trimming die structure employed in trimming the side flash shown in Figure 4 to provide the blank shown in Figure 5;

Figure 13A is a transverse section taken in the direction of line XIIIA—XIIIA of Figure 13 and additionally showing a pressure or hammer head for the trimming die structure of Figure 13;

Figure 13B is a side view in elevation of the structure of Figure 13A and taken along the line XIIIB—XIIIB of Figure 13;

Figure 13C is a perspective view of the structure of Figure 13; it will be noted that Figure 13B illustrates an additional operation which involves removing the end tongue or slug of Figure 6 to produce the blank of Figure 7; for this purpose, as shown in Figure 13C, and end cutter block is inserted in the structure of Figures 13 and 13A;

Figure 14A is a transverse section taken in the direction of the line XIVA—XIVA of Figure 14 and showing a pair of the dies in a closed, blank-forming relationship;

Figure 14B is a side sectional view in elevation taken along the line XIVB—XIVB of Figure 14A, but omitting the blank;

Figure 15 is a top plan view of one die part of two similar parts of a complementary two-part die construction which is employed to die-forge the blank of Figure 8 to form the blank of Figure 9;

Figure 15A is a cross-sectional view in elevation taken in the direction of line XVA—XVA of Figure 15 and showing a pair of dies in a closed, blank-forming relationship;

Figure 15B is a side or longitudinal section in elevation along the line XVB—XVB of Figure 15A, but omitting the blank;

Figure 16 is a perspective view in elevation of a trimming die means employed in removing the flash of Figure 9 to provide the blank of Figure 10;

Figure 16A is a side view in elevation showing a blank by dot and dash lines in position in the die of Figure 16 and pressure head or hammer in an operative position;

Figure 16B is an end view taken along the line XVIB—XVIB of Figure 16A.

Figure 1:
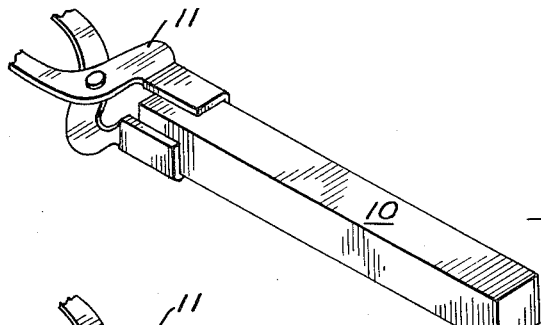
Figure 1 is a side perspective view of a square billet blank from which the bit is to be forged.

In carrying out the procedure of my present disclosure, I start with a square steel billet 10 of Figure 1, holding it at one end by tongs 11. Such billet blank is heated and preliminarily forged on a flat die forging hammer towards the extending or other end thereof which is to constitute a beginning portion of the wrench flat of the shank, the length of the blade part, and its cutting or drilling end. In this operation, the major portion 12 of the blank is substantially elongated and is shaped into the form of a rectangle, two of the sides of which are shorter than the other two sides. In the next step, while being held in the same manner, the blank is given an initial die-forging operation somewhat intermediate its length and adjacent to the portion 10 held by the tongs 11 which portion represents the shank thereof. This may be accomplished by a drop forge hammer having forming dies 25 in its ram and base of the type illustrated in Figures 12, 12A and 12B of the drawings. It will be noted that this initial die-forming operation starts the forming operation of the wide faces 14, of the water courses 15 and of the beveled side edges 16 of the blade and initiates the formation of the wrench flat portion 13 of the shank part.

Figure 4:
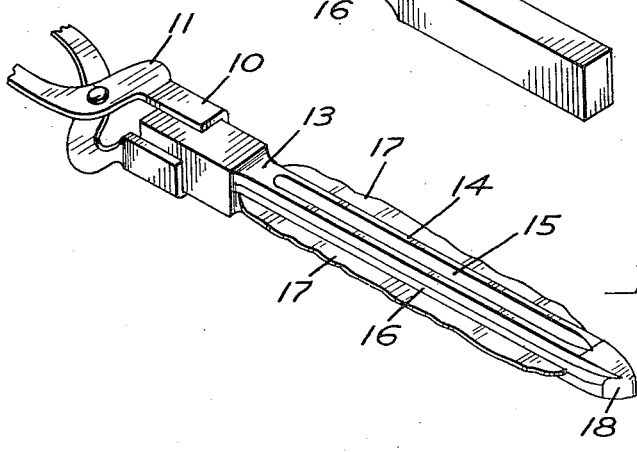
Figure 4 is a similar view after a succession or progression of blade-forming die-forging operations have been performed towards the one end of the blank, but terminating adjacent or close to such end.

Thence, a series of successive and progressively advancing operations are effected by the same dies to advance the water courses 15 and beveled sides 16 along the length of the blade towards its extending tongue-shaped excess metal end 18 to produce the blank of Figure 4 with side flash or selvage 17. The dies 25 produce a blade part whose major transverse axis is at right angles to the transverse axis of the blank of Figure 2 and which is formed up to, but short of its end. The die-forging operations tend to and do build up excess metal at this unfinished tip end 18 which is later employed to expand-form the cutting or drilling end of the blade. These operations also result in the formation of flash or selvage 17 along the parting lines of the dies which controls and limits the transverse flow of the metal by reason of the fact that the flash or selvage freezes relatively quickly.

In the next step, the flash or selvage 17 of the blank of Figure 4 is removed by inserting it in the trimming press apparatus of Figures 13 and 13A that has a pair of transverse spaced-apart trimming dies 31. At this time, the apparatus is open at each end and the blank is pushed through the opening between the dies 31 which shear the flash from it. As such blades are shorter in length than the previously formed portion of the blank, it is effected in successive stages. The resultant trimmed blank is shown in Figure 5.

Figure 14:
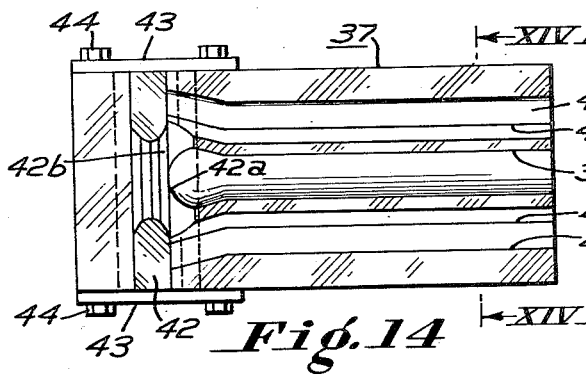
Figure 14 is a top plan view of one die part of two similar parts of a complementary two-part die construction employed in effecting the die-forming operation illustrated by Figure 6.
Figure 14:
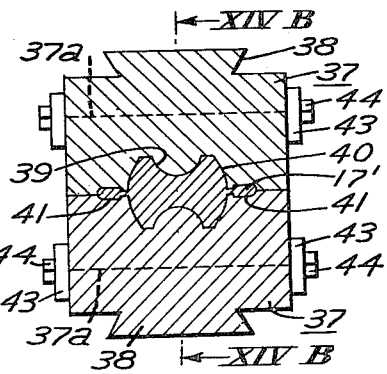
Figure 14:
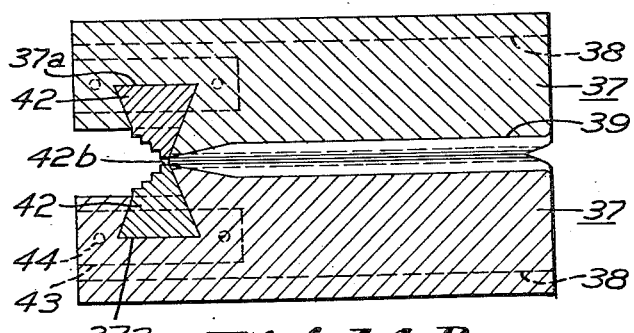

In the next step, the blank is taken from the trimming apparatus of Figure 13 and is entered between a set of forming dies 37, as illustrated in Figures 14, 14A and 14B, one of which is actuated by a drop forge hammer. The unfinished end portion 18 of the blade is then formed by these dies, as shown in Figure 6, employing the end metal or crop 18 left after the previous forming operation of Figure 5 which is sufficient to permit an outward flaring (15a and 16a) of the water courses and the narrow sides of the blade at the extreme outer end of the blade part of the blank. As a result, the cutter blade is thus finished to approximately its final dressed form, see Figures 6 and 6A. Such operation results in a transverse and longitudinal outward overflow of flash or selvage 17' along the edge of the blade part at the parting line of the dies and a selvage slug or tongue 17" at its extreme end. Such slug 17" represents a cropping off of an undesirable and excess steel which was required to properly form the blade part as well as its cutting end 19.

In the next operation, the blank of Figure 6 is taken to the previously-mentioned press trimming apparatus of Figure 13 which is now fitted, as shown in Figures 13B and 13C, with an end trimming blade part 35. The cutting end of the blank is then pushed through the one open end of the apparatus with its end slug or tongue 17" extending beyond the edge of the trimming blade 35. The press head 33 is then lowered to cut off the selvage 17' along its sides as well as the slug 17" and thus leave this portion of the bit in an approximately dressed condition, see Figure 7. The preceding procedure completes the first combination of forging steps and produces the cutter blade part.

Figure 2:
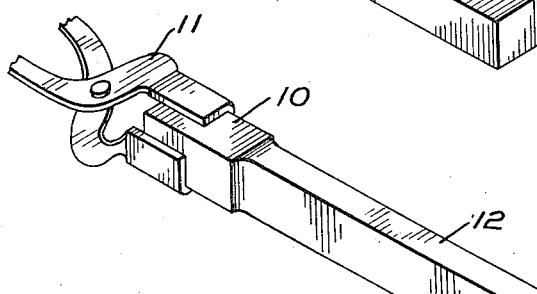
Figure 2 is a similar view of the blank with one portion thereof block or flat die-forged.
Figure 3:
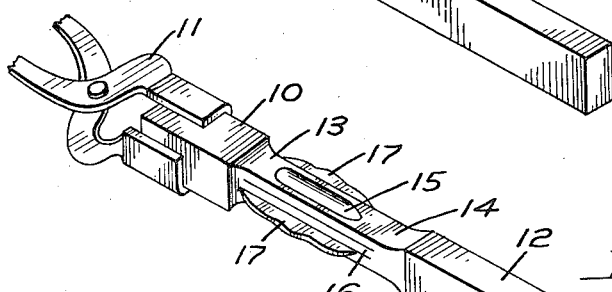
Figure 3 is a similar view after an intermediate portion of the blank has been die-forged.

As shown in Figure 8, the blank 10 is then reversed and the tongs 11 grip its opposite or previously-formed cutting blade end. The unformed square portion 10 which was left by the operation of Figure 2 is then heated and preliminarily or semiforged on flat dies in an ordinary forging hammer to produce a rough shank part 20 whose major transverse axis is reversed with respect to the axis of the like portion shown in Figure 2.

In the next step, the blank is transferred to a drop forging hammer in which is fitted a set of finishing dies 45, as shown in Figures 15, 15A and 15B. At this time, the shank is then die-formed to give the approximate rough shape of the shank part including the major portion of the wrench flat 13, and the collar 21 and pin 22 portions thereof thus producing the blank of Figure 9. This forging operation causes flash or selvage steel 23 to form along the parting line of the dies; to remove this, the forging is then transferred to a press in which is fitted a set of trimming dies 52, see Figures 16, 16A and 16B. The dies 52 accurately fit the contour of this section or portion of the blank. The blank is then pushed through these dies by a form-fitting pusher 55 which removes the selvage 23 and leaves the bit blank in the finished forged condition of Figure 10.

Subsequently, the stem portion is turned to provide it with threads 24 immediately below its collar, see Figure 11.

It will be apparent, in utilizing the die apparatus of my invention, that the shank part of the bit may also be formed before rather than after the blade part.

It will thus appear that the complete forging process as above outlined provides a percussion bit entirely under mechanical control. The only flat die work used in connection with it is the rough blocking or shaping of the steel to provide the proper volume of metal to fill the subsequently used forming dies. Thus, a completed bit forging is made under positive and complete size control in dies which form it correctly and accurately as to size and concentricity of its various parts or portions. This method produces a more homogeneous steel and develops a consistent pattern of longitudinal fiber structure.

The forming of the extreme (dressed) end portion 19 of the cutter blade to its approximate finished condition results in a bit which can be finished dressed in the field with a very slight amount of work. The quality of the steel is thus not destroyed or its grain structure distorted by being subjected to excessive and poorly controlled hand forging under adverse field working conditions. I have been able for the first time to produce a bit which is approximately in its finished form when it leaves the forging shop or plant.

The resultant bit of Figure 11 has a length about 2 or 3 times that of the original billet of Figure 1. The elongation is produced by controlled forging operations which are first completed as to the cutter blade part and its cutter end portion as well as a starting portion of the wrench flat which is considered a part of the shank part. Subsequently, the blank is then reversed, reheated and its shank part completely formed up to and including the previously or initially formed portion of its wrench flat.

It will also be noted that the first set of forming operations is conducted progressively towards the blade end of the blank and that its extreme cutting end is formed by separate operations employing excess metal which has been built up by the previous forming of the major length of the blade part and the transverse expansion thereof. The major width sides of the blade have water courses extending therealong and the minor width sides are formed and beveled to provide cutting edges. The unshaped excess metal left at the end is then transversely and longitudinally outwardly expanded and forge-formed to its substantially final finished shape to produce an end divergence of the water courses and to bell-out the narrow width sides of the blade. This flaring operation thus produces a cutter end portion whose grain and metallic characteristics correspond and are correctly sized to the grain characteristics of the remainder of the bit along its length. Flash is employed both on the sides and ends of the bit to provide a positive control of the die-forging operations effected thereon by limiting flow of the metal to a desired extent.

Figure 12:
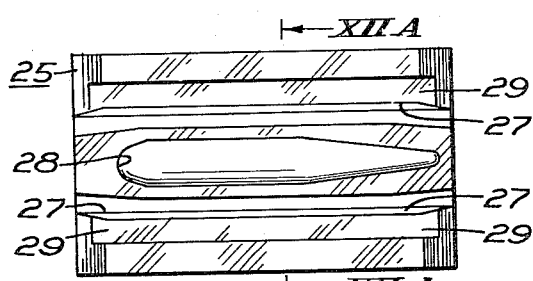
Figure 12 is a top plan view of one part of two similar parts of a complementary two-part die construction employed in carrying out the operations of Figures 3 and 4.
Figure 12:
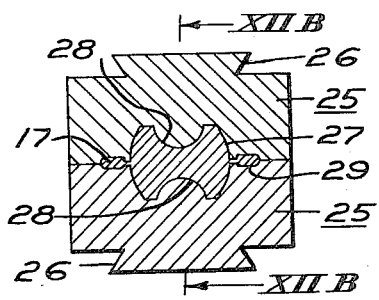
Figure 12:
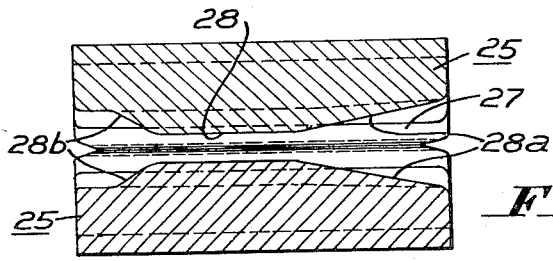

Referring particularly to Figures 12, 12A and 12B, the complementary set of forming dies 25 have dovetailed portions 26 by means of which they may be attached to a hammer and an anvil, respectively. A fuller portion 28 extends along each die 25 to form the water courses 15 on opposite major dimension transverse sides of the bit, as shown particularly in Figure 12A. Each die 25 also has transverse flash-receiving slots 29 connected to the main die cavity. The narrow sides of the blade part of the bit are formed by inclined walls 27 which along with the fuller portion 28 define half of a die cavity in each die. As shown particularly in Figure 12B, the fuller portions 28 diverge outwardly at 28a at a forward end of the die and have an outwardly diverging tail portion 28b near the other end of the die.

In the trimming die apparatus shown in Figures 13, 13A and 13B, a box 30 carries the dies 31 which are secured therein to extend longitudinally thereof in a transversely spaced-apart relationship with respect to each other by bolts 32. It will be noted from Figure 13A that the spacing between the cutting edges 31a of the dies 31 corresponds substantially to the width of the blank when it rests thereupon and that when the hammer 33 descends, it will shear the flash 17 and force the blank downwardly into the box 30. When this apparatus is employed to remove or shear off the selvage end 17″ of the blank, an end cutter die part 35 is used. It will be noted that a pair of side uprights 34 and an intermediate short-length upright 34′ extend from the bottom wall of the box 30 and have stepped portions 34a and 34′a, respectively, to dovetail with a similar portion 35a of the cutting die 35. In this manner, the cutting die 35 can be inserted by means of a handle 35b into an interlocking relationship with respect to the uprights 25 and 34, so that its cutting edge 36 is in a position to receive the inner, connecting neck portion of the slug 17″. As a result, the slug 17″ extends backwardly over the trimming die part 35 and is severed when the hammer 33 is lowered.

In Figures 14, 14A and 14B, the forming dies for the cutting end of the bit include oppositely positioned die blocks 37 each of which has dovetailed portions 38 for mounting them respectively in a hammer and an anvil and each defines a blank-forming slot by means of a fuller portion 39 and connecting side portions 40. Each also has a pair of transverse flash-receiving slots 41. An end die 42 of wedge shape is adapted to be moved into locking engagement with each die block 37 from the side thereof and to slidably fit within a wedge-shaped die slot 37a. Side plates 43 and bolts 44 hold the end die 42 in position with respect to each die block 37. It will be noted that the inner end portions of each die block 37 diverge outwardly and that the end die 42 has a rounded edge 42a. This die forming apparatus utilizes the excess metal end portion 18 of the blank of Figure 5 to form the blank of Figure 6. It will be noted that the end slug 17″ is formed by the edge 42b of the die member 42 and that the water course enlargements 15a and the side enlargements 16a are formed by the outward divergence of the inner end portions of the forming faces of the dies 37 when they are moved into a closed relationship, as shown in Figures 14A and 14B. The narrow top edges 42b of the die member 42 define a metal escape slot to form the connecting portion between the end slug 17″ and the end 19 of the blank, see Figures 6 and 14B. Each die member 42 is wedge shaped and provided on the side thereof remote from the blank-forming slot with a stepped formation which materially increases the extent of the heat dissipating or cooling surface thereof and contributes to the cooling of the edge 42b thereof and also to the end of the blank-forming slot.

In Figures 15, 15A and 15B, the set of complementary dies 45 has dovetailed portions 46 for mounting them respectively in a hammer and an anvil and have opposed slotted wall portions 47, 47a, 47b, and 47c to define the die opening. A pair of transverse flash-receiving slots 48 are also defined as shown in Figure 15A. The wall portion 47 is of enlarged, semi-circular form in each die 45 to provide the collar 21 of the bit, see Figure 9, has a flattened wall portion 47a to provide the wrench flat 13, a fuller wall portion 47b to overlap-form the blade part (14, 15, 16), and a cone-shaped end portion 47c to form the pin end 22 of the shank part of the bit.

As shown in Figure 15B, the end portion 47c of each die 45 has an outwardly beveled portion 47d that defines an outwardly-diverging and open flash-passing slot with a like portion 47d of the other die 45; in this connection, see Figure 9.

In Figures 16, 16A and 16B, the trimmer dies 52 are carried in a box 50 on uprights 51 and are secured in a transversely, spaced-apart relationship by bolts 53. As shown particularly in Figure 16, the shank part of the blank is adapted to rest upon the cutting edges 52a of the trimmer dies 52, so that when the hammer 54 and its die head 55 are lowered, the shank part is forced between the edges 52a and the flash 23 of the blank of Figure 9 is removed to provide the blank of Figure 10.

What I claim is:

1. A pair of opposed die blocks for die-forging a cutting end portion of a blade part of a well bit, one of said die blocks being adapted to be mounted on a hammer and the other being adapted to be mounted on an anvil, the opposite face of each die block having a die cavity open to one end thereof and extending longitudinally therealong; an end die positioned within the die cavity of each die block and having a rounded forward edge and an offset rear edge for enlarging a cutting end of a blade part of the bit; said die cavity being enlarged towards the forward edge of said end die, having side flash pockets for transverse-outward flow of metal, and having an outwardly-open restricted end cavity for longitudinal-outward flow of metal.

2. A pair of opposed die blocks for die-forging a cutting end portion of a blade part of a well bit, one of said die blocks being adapted to be mounted on a hammer and the other being adapted to be mounted on an anvil, the opposite face of each die block having a die cavity open to one end thereof and extending longitudinally therealong and having a transversely enlarged portion near the other end of said die block, and an end die mounted transversely within each die block at the transversely enlarged portion of said die cavity to co-operate therewith and enlarge a cutting end of a blade part of the bit; said die cavity having side and end flash pockets for transverse and endwise outward flow of metal to form flash on the cutting end portion of the bit.

3. A pair of die blocks as defined in claim 2 wherein, said die cavity of each die block is enlarged and outwardly open from its other end to said end die, and said end die has a declining step construction towards the other end of said die cavity.

4. A pair of oppositely positioned cooperating die blocks for die-forging the cutting ends of drill bits, such blocks being relatively movable into and out of contact with the other and each such block having a longitudinally extending open ended recess located in the face thereof adjacent the other block with the recesses of the blocks cooperating when the blocks are in contact with each other to form a die cavity between the blocks which is fully open at one end and communicates throughout its length with an elongated flash delivery aperture extending from the open end thereof along each side of such cavity and across the end thereof opposite to said open end.

5. A pair of oppositely positioned die blocks for die-forging the cutting ends of drill bits, one such block being adapted to be mounted on a movable member and being movable into and out of contact with the other block of the pair; each such block having a recess formed in the face thereof adjacent the other block and extending longitudinally from end to end of the block; and a separate die member secured to each block and extending across one end of the recess formed therein; said recesses cooperating when the blocks are in contact with each other, to form a die cavity fully open at one end and communicating throughout its length with an elongated flash delivery aperture which extends from such open end along each side of said cavity and across the end thereof opposite said open end.

6. A pair of oppositely positioned cooperating die blocks for die-forming the cutting ends of drill bits, said blocks being relatively movable into and out of contact with each other and each such block having an open ended recess formed in the surface thereof adjacent the other block, with each such recess extending longitudinally of the block from end to end thereof and a separate die member having an extended cooling surface on one side thereof, secured to each such block across one end thereof and across one end of the recess formed therein; said recesses cooperating when the blocks are in contact, to form a longitudinally extending die cavity which is fully open at one end, is provided with extended cooling surface at the other end, and communicates throughout its extent with a flash delivery aperture extending from the open end thereof along each side of such cavity and between adjacent edges of said separate die members.

References Cited in the file of this patent

UNITED STATES PATENTS

| | | |
|---|---|---|
| 426,685 | Safford | Apr. 29, 1880 |
| 603,887 | Bradbury | May 10, 1898 |
| 1,003,048 | Jamieson | Sept. 12, 1911 |
| 1,039,380 | Gill | Sept. 24, 1912 |
| 1,561,326 | Harrison | Nov. 10, 1925 |
| 1,881,535 | Hargrave | Oct. 11, 1932 |
| 1,994,178 | Raiche | Mar. 12, 1935 |
| 2,112,645 | Bedford | Mar. 29, 1938 |
| 2,163,935 | Cook | June 27, 1939 |
| 2,216,562 | Spang | Oct. 1, 1940 |